US010745938B2

(12) United States Patent
Vandewall et al.

(10) Patent No.: US 10,745,938 B2
(45) Date of Patent: Aug. 18, 2020

(54) INTEGRATED LOCKS WITH VISUAL INDICATORS FOR AIRCRAFT GALLEY SYSTEMS

(71) Applicant: The Boeing Company, Chicago, IL (US)

(72) Inventors: Cynthia A. Vandewall, Snohomish, WA (US); Kai Shen Elston Cheah, Singapore (SG); Jun Yuan Dexter Tan, Singapore (SG)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 15/477,214

(22) Filed: Apr. 3, 2017

(65) Prior Publication Data
US 2017/0204635 A1 Jul. 20, 2017

Related U.S. Application Data

(63) Continuation of application No. 14/637,043, filed on Mar. 3, 2015, now Pat. No. 9,624,693.

(51) Int. Cl.
*E05B 41/00* (2006.01)
*B64D 11/04* (2006.01)
(Continued)

(52) U.S. Cl.
CPC ............. *E05B 41/00* (2013.01); *B64D 11/04* (2013.01); *E05B 17/10* (2013.01); *E05C 1/10* (2013.01)

(58) Field of Classification Search
CPC . E05C 1/10; E05B 17/10; E05B 41/00; E05B 81/76; E05B 81/54; B64D 11/04; B64C 1/1407
See application file for complete search history.

(56) References Cited

U.S. PATENT DOCUMENTS 4,994,722 A * 2/1991 Dolan ................... B64D 11/02
244/129.5
5,300,875 A * 4/1994 Tuttle ...................... H02J 50/15
320/138
(Continued)

OTHER PUBLICATIONS

"60—Squeeze-Release Latches", Southco, Retrieved from the Internet: <http://www.southco.com/en-us/60>, Accessed on Mar. 3, 2015, 2 pgs.
(Continued)

*Primary Examiner* — Valentina Xavier
(74) *Attorney, Agent, or Firm* — Kwan & Olynick LLP

(57) ABSTRACT

Provided are integrated locks, aircraft galley systems using such locks, and aircraft including such galley systems. An integrated lock has a low profile and provides secure locking and visual indication of the lock status to meet various FAA regulations. The visual indication may be provided mechanically (e.g., by moving a two-color indicator between two positions) or electronically (e.g., by triggering a switch connected to a light or an electro-chromic device). Furthermore, a main indicator may be connected to multiple different locks to provide a combined visual indication of the status of all locks. A visual indicator may be disposed on a galley system frame. Each integrated lock may include a handle portion and a locking portion connected to the handle portion and configured to engage the galley system frame when the handle portion is in the locked position and the door is closed.

20 Claims, 7 Drawing Sheets

(51) Int. Cl.
*E05B 17/10* (2006.01)
*E05C 1/10* (2006.01)

(56) References Cited

U.S. PATENT DOCUMENTS

| | | | | |
|---|---|---|---|---|
| 5,490,698 A * | 2/1996 | Dezso | ............... | E05B 45/06 |
| | | | | 292/138 |
| 6,260,392 B1 | 7/2001 | Geiger | | |
| 6,633,239 B2 * | 10/2003 | Plude | ............... | B64C 1/14 |
| | | | | 244/129.3 |
| 6,950,033 B1 * | 9/2005 | Guyre | ............... | E05B 17/10 |
| | | | | 340/542 |
| 7,145,436 B2 * | 12/2006 | Ichikawa | ............... | E05B 85/01 |
| | | | | 340/5.72 |
| 7,458,441 B2 | 12/2008 | Hu | | |
| 8,888,045 B2 * | 11/2014 | Boren | ............... | E05F 15/00 |
| | | | | 244/118.5 |
| 9,624,693 B2 | 4/2017 | Vandewall et al. | | |
| 9,879,445 B2 * | 1/2018 | Gopalakrishnan | ............... | |
| | | | | E05B 27/0003 |
| 2005/0279823 A1 | 12/2005 | Mitchell | | |
| 2005/0285717 A1 * | 12/2005 | Ieda | ............... | B60Q 1/2669 |
| | | | | 340/5.72 |
| 2007/0182594 A1 * | 8/2007 | Face | ............... | H03K 17/951 |
| | | | | 341/20 |
| 2010/0186162 A1 * | 7/2010 | Leonard | ............... | E04H 1/1216 |
| | | | | 4/664 |
| 2011/0016938 A1 * | 1/2011 | Chi | ............... | E05B 41/00 |
| | | | | 70/432 |
| 2014/0078569 A1 * | 3/2014 | Takahashi | ............... | G02F 1/155 |
| | | | | 359/266 |
| 2014/0311197 A1 * | 10/2014 | Abel | ............... | E05B 41/00 |
| | | | | 70/432 |
| 2015/0137531 A1 * | 5/2015 | Papanikolaou | ............... | E05B 77/28 |
| | | | | 292/201 |
| 2015/0300054 A1 * | 10/2015 | Seibt | ............... | B64D 11/02 |
| | | | | 244/118.5 |
| 2016/0138301 A1 * | 5/2016 | Schmitz | ............... | B64D 11/003 |
| | | | | 292/336.3 |
| 2016/0258188 A1 | 9/2016 | Vandewall et al. | | |
| 2018/0080251 A1 * | 3/2018 | Martin | ............... | E05B 15/0205 |
| 2018/0186531 A1 * | 7/2018 | McBride | ............... | G07C 9/00722 |

OTHER PUBLICATIONS

"U.S. Appl. No. 14/637,043, Examiner Interview Summary dated Dec. 12, 2016", 1 page.
"U.S. Appl. No. 14/637,043, Notice of Allowance dated Dec. 12, 2016", 11 pages.
"F5, Manual Chaper: Platform Maintenance", AskF5, Retrieved from the Internet: <https://support.f5.com/kb/en-us/products/big-ip_ltm/manuals/product/pg-viprion-4800/3.print.html>, Accessed on Mar. 3, 2015, 12 pgs.
"Push to Close Latches", Southco, Retrieved from the Internet: <http://www.tr.ecph.com/subcat.cfm?catid=15>, Accessed on Mar. 3, 2015, 2015, 3 pgs.

* cited by examiner

INTEGRATED LOCKS WITH VISUAL INDICATORS FOR AIRCRAFT GALLEY SYSTEMS

CROSS-REFERENCE TO RELATED APPLICATIONS

This application is a continuation of U.S. application Ser. No. 14/637,043, entitled "Integrated Locks with Visual Indicators for Aircraft Galley Systems" filed on Mar. 3, 2015, which is incorporated herein by reference in its entirety for all purposes.

TECHNICAL FIELD

This disclosure generally relates to integrated locks or, more specifically, to integrated locks having visual indicators for aircraft galley systems.

BACKGROUND

Aircraft galley systems have various carts and doors that need to be secured in closed positions during operation of aircraft. For example, airline meals are typically stored and served using galley carts that are rolled up and down passenger aisles but otherwise stored in galleys systems, for example, under the counters. Similar carts may be used for items available for sale. Waste carts are used for collecting waste (e.g., food service waste) and other refuse during flights. Furthermore, an aircraft galley may include various cabinets for storing different items. While the carts are typically rolled on the floor of the cabin and stored at that level, the cabinets may be positioned at various height levels. The current Federal Aviation Administration (FAA) regulations require secure locking of various galley carts and cabinet doors referenced above. Furthermore, the FAA regulations require visual indications of the locked status. Conventional locks used for galley carts and cabinets are cumbersome to use, heavy, and do not provide adequate visual indication.

SUMMARY

Provided are integrated locks, aircraft galley systems using such locks, and aircraft including such galley systems. An integrated lock has a low profile and provides secure locking and visual indication of the lock status to meet various FAA regulations. The visual indication may be provided mechanically (e.g., by moving a two-color indicator between two positions) or electronically (e.g., by triggering a switch connected to a light or an electro-chromic device). Furthermore, a main indicator may be connected to multiple different locks to provide a combined visual indication of the status of all locks. A visual indicator may be disposed on a galley system frame. Each integrated lock may include a handle portion and a locking portion connected to the handle portion and configured to engage the galley system frame when the handle portion is in the locked position and the door is closed.

In some embodiments, an integrated lock for use in a galley system of an aircraft includes a frame, door, handle portion, locking portion, handle compression device, and visual indicator. Some of these components, e.g., the frame and door, may be also parts of other devices of the galley system. It should be noted that for purposes of this disclosure, the door is used to describe any component that needs to be retained in the closed position with respect to the frame. As such, the door may be a swinging door, a sliding door, a portion of a cart, and any other like component. The door is movable with respect to the frame between its open position and its closed position. It should be also noted that the integrated lock is effectively operable when the door is in its closed position. When the door is in its open position, the integrated lock is generally not operable as further described below.

The handle portion is movably attached to the door. Specifically, the handle portion is movable with respect to the door and with respect to the frame between its locked position and its unlocked position. A user may operate the handle portion and move it between these two positions. In some embodiments, the integrated lock is a equipped with a device (e.g., a handle compression device as further described below) that maintains the handle portion in its locked position unless an external force is applied to handle portion during operation of the integrated lock.

The locking portion is attached to the handle portion and is movable together with the handle portion with respect to the door and with respect to the frame. In some embodiments, the locking portion and handle portion have a monolithic structure and are effectively portions of the same component. When the handle portion is in the locked position, the locking portion engages the frame and prevents the door from moving away from the frame and maintains the door in the closed position. However, when the handle portion is in the unlocked position, the locking portion is configured to stay clear from frame thereby allowing the door to move away from the frame between the open and closed positions. It should be noted that the handle portion may need to be in the unlocked position when the door returns from the open position into the closed position. In some embodiments, the shape of the locking portion is such that when the door returns from the open position into the closed position, the locking portion and, as a result, the handle portion are automatically pushed into the unlocked position, at least temporary. Once the locking portion clears the frame, the locking portion and the handle portion may be automatically returned into the locked position by, for example, the handle compression device. For example, the locking portion may have a taper on its side surface such that its leading surface (when the door returns from the open position into the closed position) is narrower than its trailing surface that later engages with the frame.

The handle compression device is connected to the handle portion and outwardly urging the handle portion to the locked position. As such, when no external forces are exerted into the handle portion, e.g., by a user, the handle compression device moves the handle portion to the locked position. In this position, the locking portion engages to the frame and prevents the door from moving away from the frame. In some embodiments, the handle compression device is compressible thereby allowing the handle portion inwardly advancing from the locked position into the unlocked position, e.g., when the external force is applied to the handle portion by a user. In some embodiments, the handle compression device is a spring.

The visual indicator is controlled by at least one of the locking portion or the handle portion. In some embodiments, the visual indicator directly interfaces the locking portion when the handle portion is in the locked position and when the door is closed. The visual indicator may be supported by the frame. As such, when the door is open, the visual indicator remains attached to the frame. Furthermore, when the door is open, the visual indicator does not interface the locking portion regardless of the position of the handle portion.

The visual indicator is configured to switch between its locked and unlocked indications. Specifically, the visual indicator has the locked indication when the handle portion is in the locked position and the door is in the closed position. The visual indicator has the unlocked indication when the handle portion is in the unlocked position and the door is still in the closed position. Furthermore, the visual indicator may always have the unlocked indication when the door is in the open position regardless of the position of the handle portion.

In some embodiments, the visual indicator includes a first side having a first color and a second side having a second color that is different from the first color. The first color may represent the locked indication of the visual indicator and may be, for example, green. The second color represents the unlocked indication of the visual indicator and may be, for example, red. The frame may include a frame opening such that the first side of the visual indicator is aligned with the frame opening when the handle portion is in the locked position and the door is closed. In this situation, the first color is visible to the operator through the frame opening. Furthermore, the second side of the visual indicator is aligned with the frame opening when the handle portion is in the unlocked position and the door is closed. In this situation, the second color is visible to the operator through the frame opening. The second side of the visual indicator may be also aligned with the frame opening when the door is open regardless of the position of the handle portion. The visual indicator may be advanced with respect to the frame opening by the locking portion as the handle portion moves between the locked position and the unlocked position. In some embodiments, the visual indicator is advanced along the direction substantially normal to the frame opening.

In some embodiments, the integrated lock also includes a frame compression device disposed between the frame and the visual indicator. The frame compression device urges the visual indicator in the direction toward the locking portion when the handle portion is in the locked position. The locking portion, however, prevents, the visual indicator to advance in this direction and the first side of the visual indicator may remained aligned with the frame opening. When the handle portion is in the unlocked position, the frame compression device advances the visual indicator into a new position such that the second side of the visual indicator is now aligned with the frame opening. Specifically, wherein the frame compression device keeps the visual indicator such that the visual indicator has the unlocked indication when the locking portion does not contact the visual indicator. A combination of forces exerted on the visual indicator by the frame compression device and by the handle compression device is such that the visual indicator has the locked indication when no external forced applied to the handle portion and when the door is in the closed position.

In some embodiments, the door includes a door opening. The door opening aligns with the frame opening when the door is in the closed position. Alternatively, the door may not extend over the frame opening when the door is in the closed position. In either case, the frame opening may be visible when the door is closed. In some embodiments, the integrated lock does not have any door or frame openings. For example, the locking indication may be provided by a light triggered by the switch as further described below. The light may be position on a portion of the frame that does not get obstructed by the door when the door is closed.

In some embodiments, the visual indicator includes a light and a switch. The switch may contact at least one of the locking portion or the handle portion when the handle portion is in the locked position. The switch turns the light on when the handle portion is in the unlocked position or moves to the unlocked position and turns the light off when the handle portion is in the locked position or moves to the locked position. In some embodiments, the switch is further connected to a main indicator receiving input from at least one additional switch of an additional integrated lock. The main indictor may have the unlocked indication if any one of the integrated lock and the additional integrated lock are in the unlocked position.

In some embodiments, the visual indicator includes an indication device and a switch. The switch may be actuated by the at least one of the locking portion or the handle portion when the door is in the closed position. The switch may generate an electrical power as the handle portion moves between the locked and unlocked positions. For example, the switch may be a piezoelectric switch. In some embodiments, the indication device switches between the locked and unlocked indications when the switch generates the electrical power and maintains one of the locked unlocked indications when the switch does not generates the electrical power. The visual indicator may include an antenna for wireless communication with a main indicator and transmitting an RF signal to the main indicator when the switch is actuated by the at least one of the locking portion or the handle portion.

Also provided is an aircraft having a galley system equipped with an integrated lock. Various examples of integrated locks are described elsewhere in this disclosure.

BRIEF DESCRIPTION OF THE DRAWINGS

Figure 1:
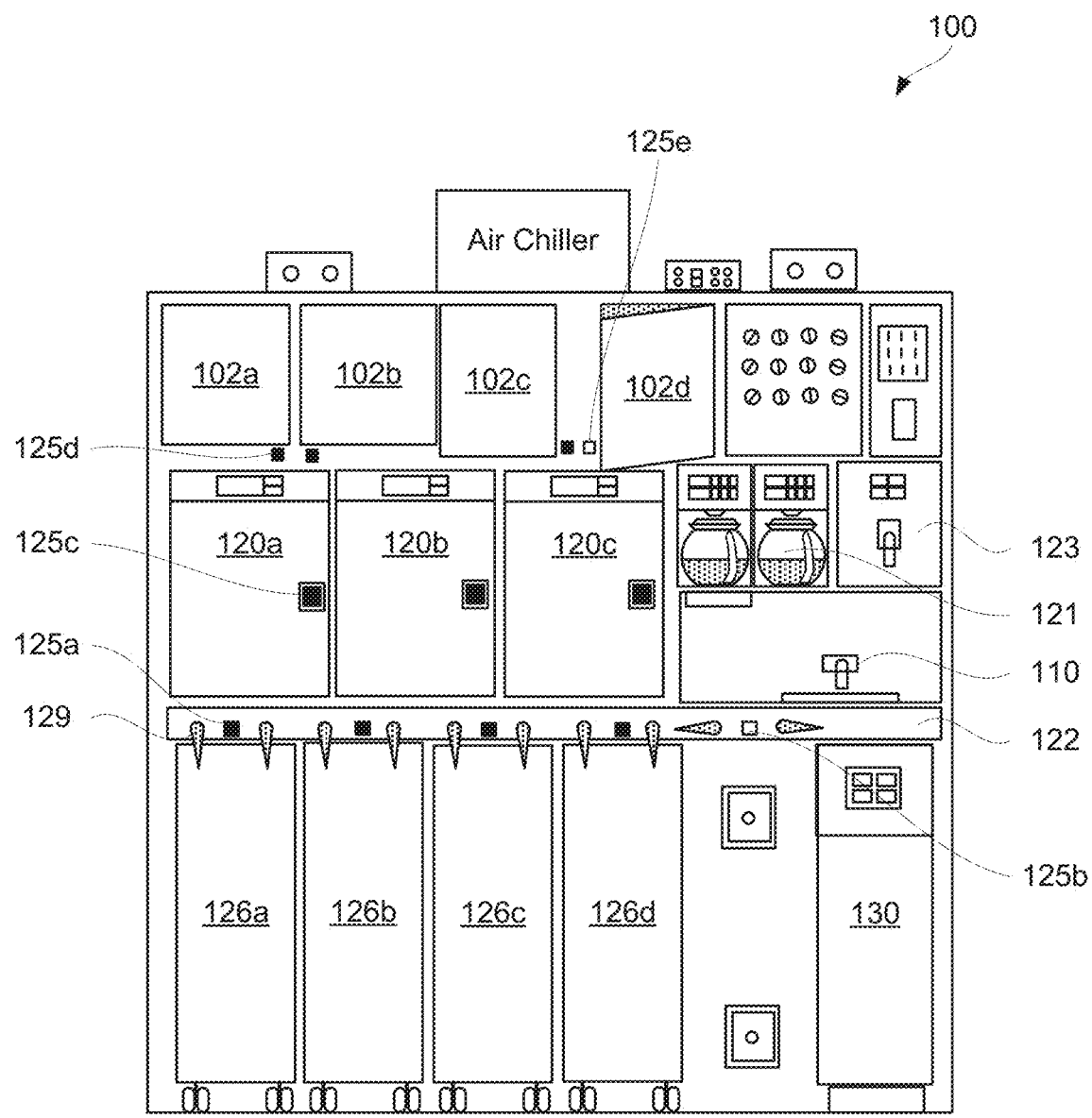

Having thus described examples of the disclosure in general terms, reference will now be made to the accompanying drawings, which are not necessarily drawn to scale, and wherein like reference characters designate the same or similar parts throughout the several views, and wherein:

FIG. 1 is a schematic representation of a galley system having integrated locks, in accordance with some embodiments.

Figure 2A:
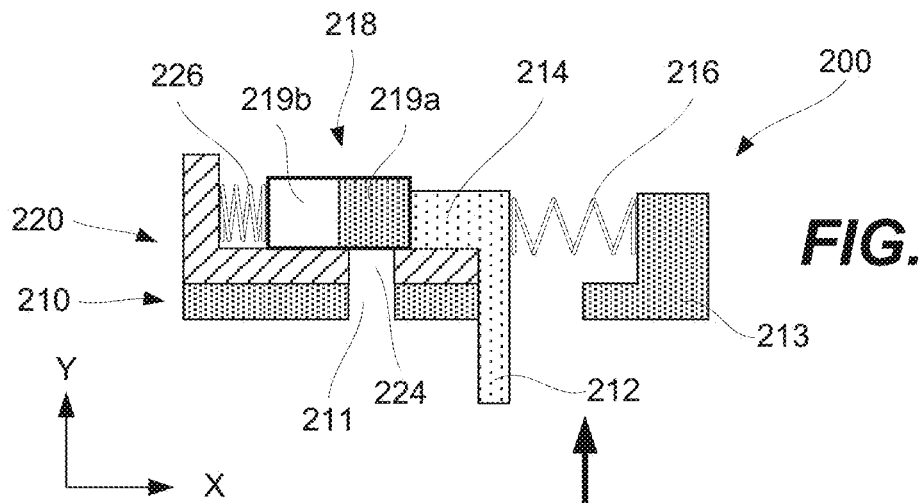

FIG. 2A is a schematic representation of an integrated lock in a locked position with a door in a closed position, in accordance with some embodiments.

Figure 2B:
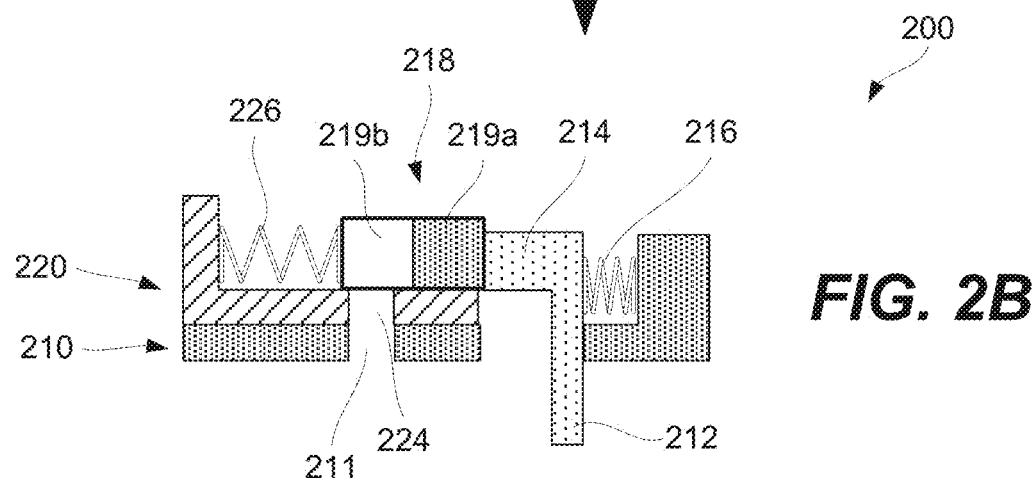

FIG. 2B is a schematic representation of the integrated lock of FIG. 2A in an unlocked position with the door still in the closed position, in accordance with some embodiments.

Figure 2C:
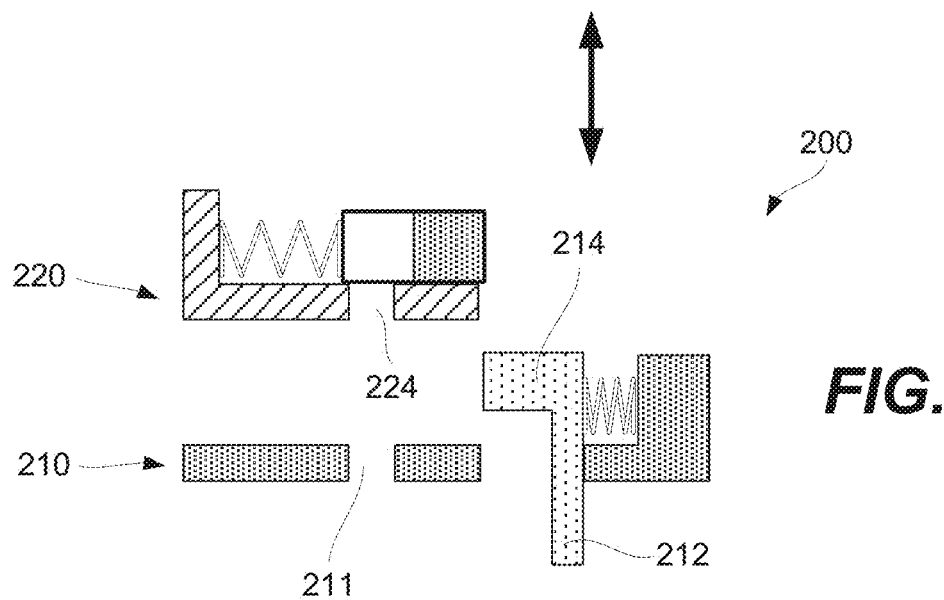

FIG. 2C is a schematic representation of the integrated lock of FIG. 2A in the unlocked position with the door in an open position, in accordance with some embodiments.

Figure 2D:
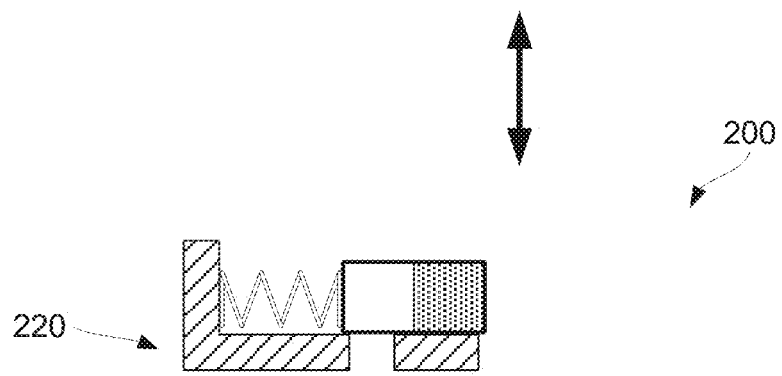

FIG. 2D is a schematic representation of the integrated lock of FIG. 2A in the locked position with the door in the open position, in accordance with some embodiments.

Figure 2E:
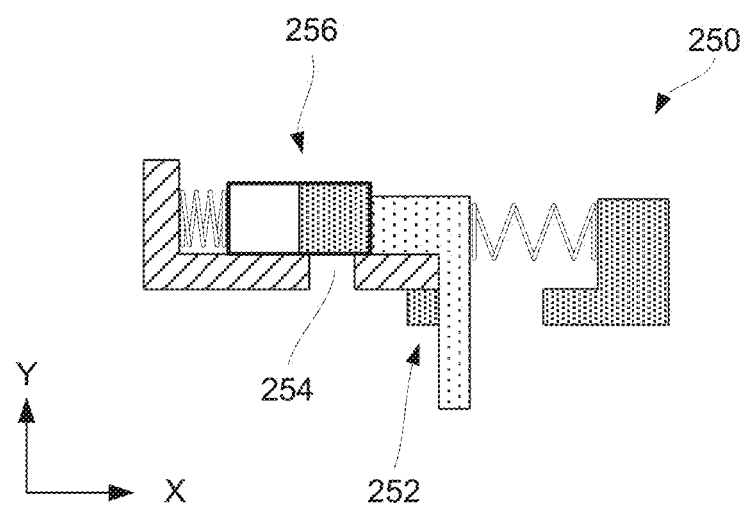

FIG. 2E is a schematic representation of an integrated lock in which a door does not extend over a frame opening, in accordance with some embodiments.

Figure 3:
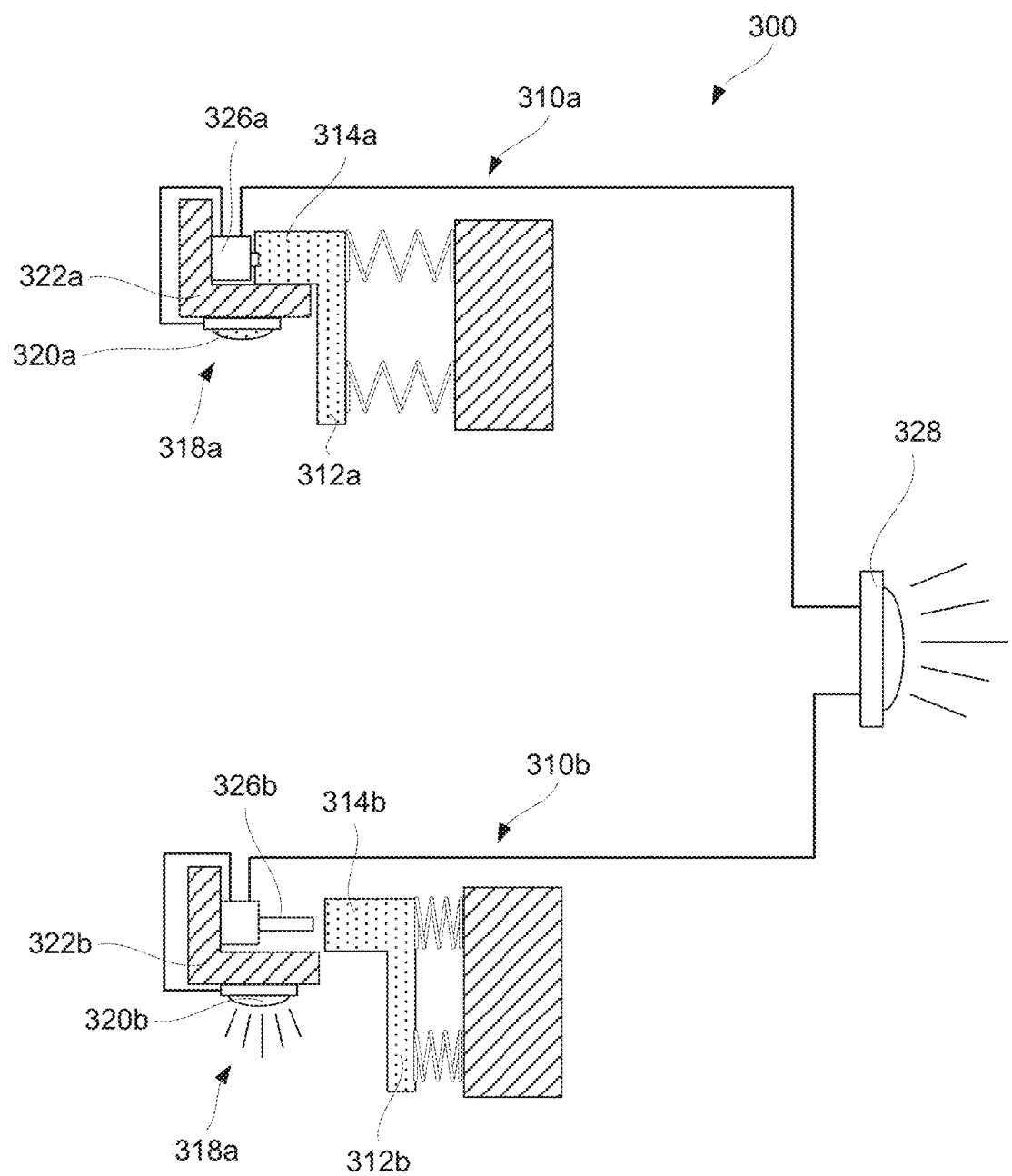

FIG. 3 is a schematic representation of an integrated lock assembly having two integrated locks having wired connection to a main indicator, in accordance with some embodiments.

Figure 4:
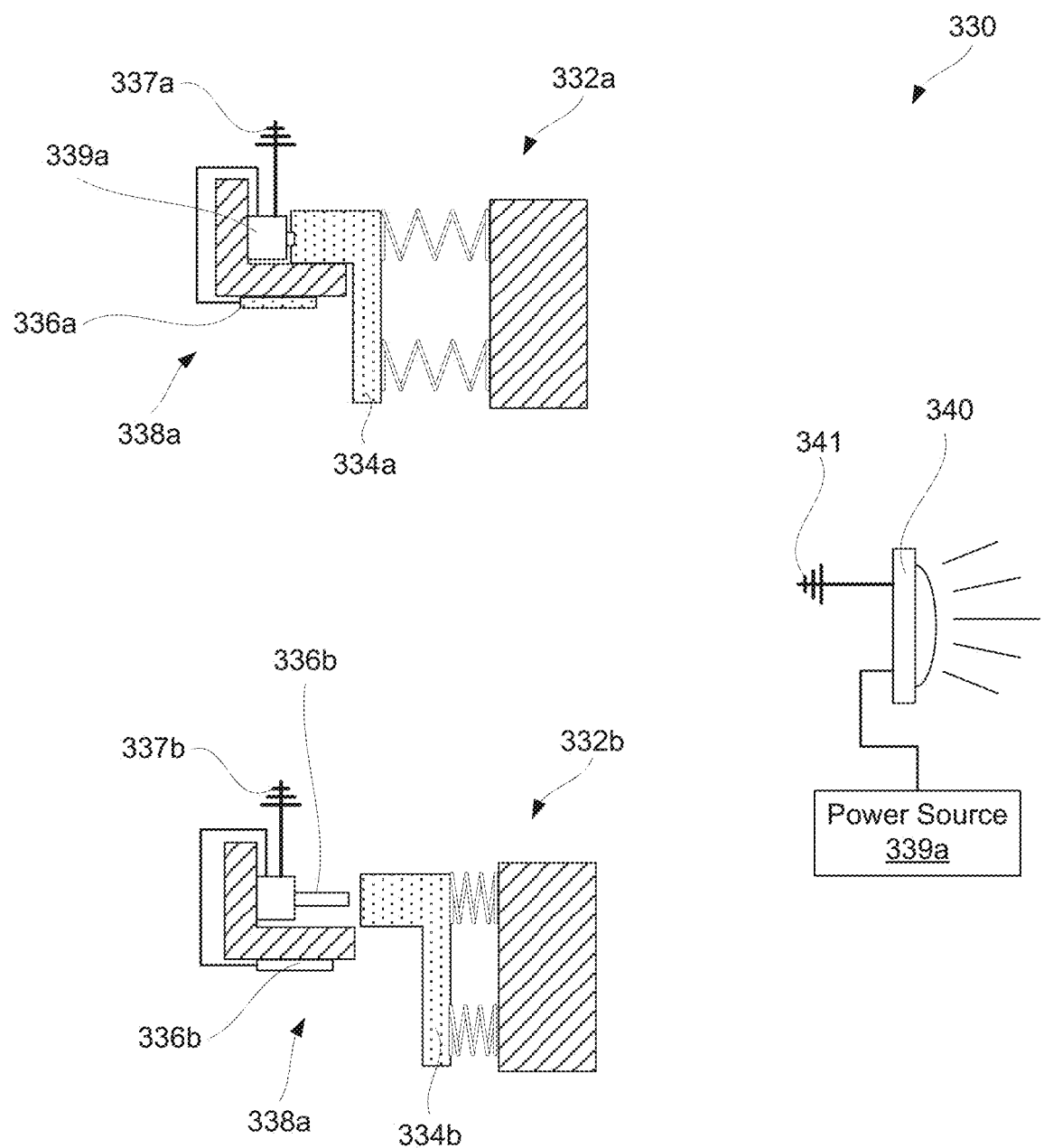

FIG. 4 is a schematic representation of another integrated lock assembly having two integrated locks wirelessly connected to a main indicator, in accordance with some embodiments.

Figure 5:
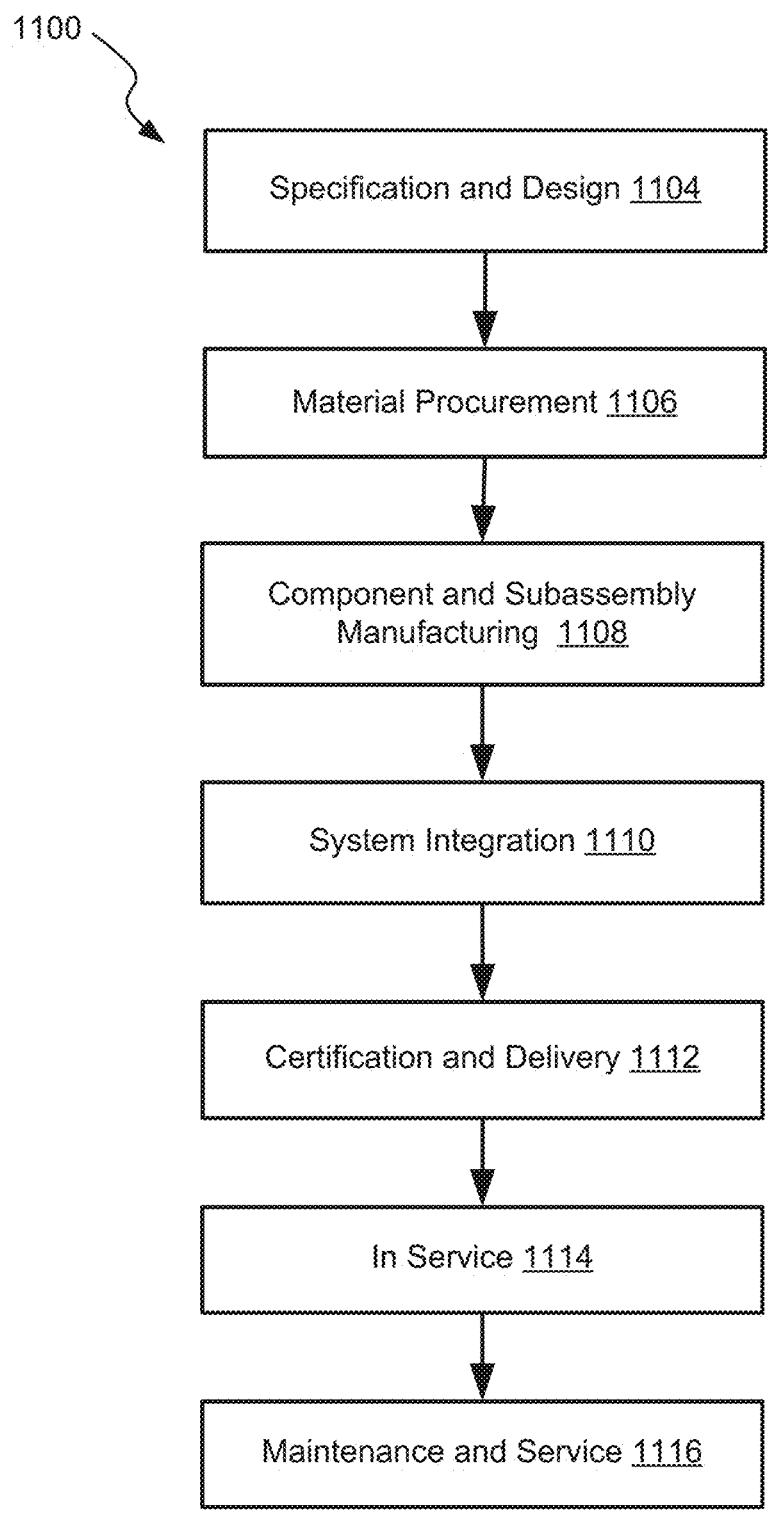

FIG. 5 is a block diagram of an aircraft production and service methodology that may utilize one or more integrated locks.

Figure 6:
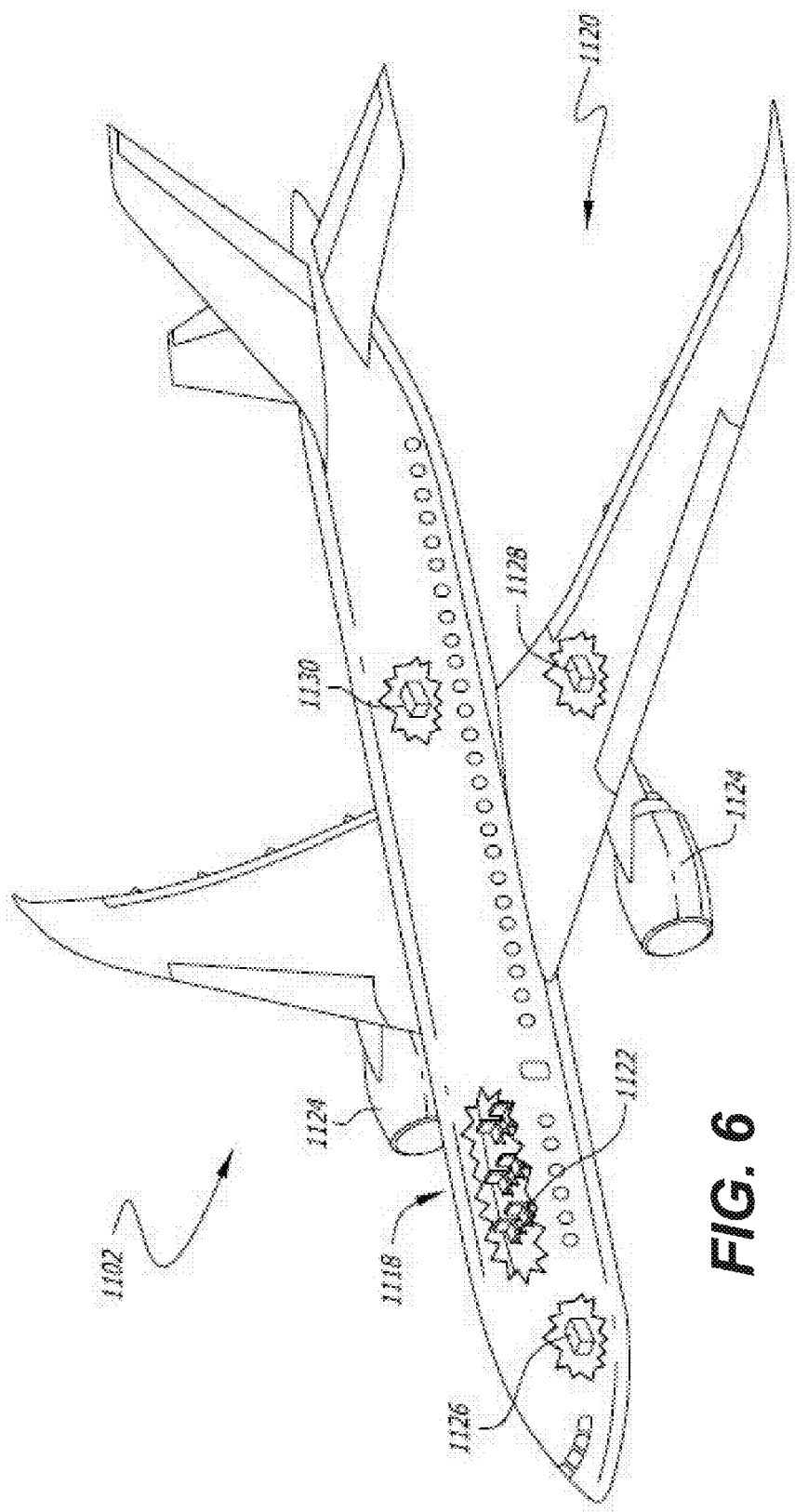

FIG. 6 is a schematic illustration of an aircraft that may utilize one or more integrated locks.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

Many movable components of aircraft galley systems need to be secured during operation of aircraft. For example, cabinet doors need to be closed and locked or, more specifically, retained with respect to the frame of an aircraft galley system when these cabinets are not being used. Likewise, carts need to be locked to the frame when not in use. In addition to securing a door or a cart, a locking device also needs to provide some visual indication of the locking status (whether the door is closed and locked or not). These factors coupled with a large number of different cabinet doors and carts in the same galley system as well as space and weight requirements associated with aircraft applications present significant design challenges for locks used in galley systems on aircraft.

Some conventional locking systems have visual indicators positioned on moving components, such as doors or carts. One example is a lavatory door on an aircraft. However, these indicators often do not provide required indications. For example, a door may be slightly ajar with its visual indicator still showing the door being locked. For example, when the door is opened and the locking mechanism on the door is not in contact with any frame component, the locking mechanism may move back into the locked position, triggering a corresponding response from the visual indicator, without actually securing the door. This may lead to potentially dangerous conditions when the door is not properly secured while a user gets a false sense of security. Furthermore, visual indicators of many conventional locking systems are hard to see and do not provide central indication when multiple visual indicators are present in the same location. As such, even if a proper visual indication is provided, it could be easily missed by a user resulting in potentially unsafe conditions, such as items falling from a cabinet or a free-rolling cart. Considering movements and vibrations of typical aircraft as well as tight spaces near galley systems, these unsafe conditions can quickly escalate and cause significant damage and/or injury.

A brief description of a galley system is provided herein to better reflect various features of integrated locks. FIG. 1 is schematic view of galley system 100, in accordance with some embodiments. Galley system 100 includes various doors 102a-102d and 120a-120c and carts 126a-126d that may utilize integrated locks 125a-125e. Other components of galley system 100, such as sink 110 and trash compactor 130 may also utilize integrated locks for supporting various components, such as removable sink cover, doors, and the like, even though these integrated locks are not specifically shown in FIG. 1. Other components, such as coffee maker 121 and water boiler 123 are shown for reference and may not include integrated locks.

Carts 126a-126d may be stowed under counter 122. Integrated locks 125a and 125b may be used to securely retain these carts 126a-126d in their stowed positions and to provide visual indication that carts 126a-126d are secured in their positions and will not roll out from under counter 122. In some embodiments, additional latching mechanisms 129 may be used together with integrated locks 125a and 125b. Additional latching mechanisms 129 may be used for particularly heavy items (e.g., when particularly large forces are expected on integrated locks 125a and 125b) in order to provide additional strength. For example, for light carts (e.g., empty carts, waste carts) integrated locks 125a and 125b may be used without additional latching mechanisms. As such, only integrated locks 125a and 125b may be used for securing these light-weight carts. However, for heavy carts (e.g., loaded carts) integrated locks 125a and 125b may be used together with additional latching mechanisms 129. These additional latching mechanisms 129 may be conventional latching systems, such as model 3100 available from Adams Rite Aerospace of Fullerton, Calif.

Integrated locks 125a-125e have visual indicators. For example, integrated lock 125a shown above cart 126a has a locked indication (shown with a black fill). On the other hand, integrated lock 125b shown above the empty cart space has an unlocked indication (shown as an unfilled square). In a similar manner, integrated lock 125d corresponding to closed door 102a has a locked indication (shown with a black fill), while integrated lock 125e corresponding open door 102d has an unlocked indication (shown as an unfilled square).

Typically, an integrated lock secured a movable part with respect to a stationary part. For purposes of this document, all types of movable parts secured by integrated locks are referred to as doors, while all corresponding stationary parts are referred to as frames. Furthermore, an integrated lock may be also used to secure two movable parts with respect to each other, such that when secured the two movable parts cannot move with respect to each other.

Examples of Integrated Cabinet Locks

FIGS. 2A-2D illustrate integrated lock 200 used to lock door 210 relative to frame 220 at various operating states of integrated lock 200, in accordance with some embodiments. Specifically, FIG. 2A illustrates door 210 in its closed position and integrated lock 200 in its locked position. At this state, door 210 is not movable relative to frame 220 and visual indicator 218 shows a locked indication. FIG. 2B illustrates door 210 still being in its closed position while integrated lock 200 being switched to the unlocked position. At this state, door 210 is movable relative to frame 220 and visual indicator 218 shows an unlocked indication. FIG. 2C illustrates door 210 in its open position while integrated lock 200 is still to the unlocked position. At this state, door 210 is also movable relative to frame 220 and visual indicator 218 shows the unlocked indication. Finally, FIG. 2D illustrates door 210 in the open position while integrated lock 200 moves to the locked position (e.g., after the operator releases handle portion 212). At this state, door 210 is still movable relative to frame 220 and visual indicator 218 shows the unlocked indication. It should be noted that the indication of visual indicator 218 corresponds to door 210 being able to move relative to frame 220 rather than to the position of integrated lock 200, which is one distinguishing feature of integrated lock 200 relative to many conventional locking systems. Each state and corresponding positions of integrated lock 200, ability of door 210 to move relative to frame 220, and indications of visual indicator 218 are summarized in the following table.

TABLE

| Figure representing state | Position of Door relative to Frame | Position of Integrated Lock | Ability of Door to Move relative to Lock | Visual Indication |
|---|---|---|---|---|
| FIG. 2A | Closed | Locked | Not movable | Locked |
| FIG. 2B | Closed | Unlocked | Movable | Unlocked |
| FIG. 2C | Open | Unlocked | Movable | Unlocked |
| FIG. 2D | Open | Locked | Movable | Unlocked |

Integrated lock 200 includes handle portion 212 movable with respect to frame 220 and/or with respect to door 210 between its locked position and unlocked position. The position of handle portion 212 may be also referred to as the position of integrated lock 200 as described above and shown in the table. Referring to FIGS. 2A and 2B, handle portion 212 is movable along the X direction. This movement of handle portion 212 may be in the direction substantially normal to the frame opening 224. Overall, handle portion 212 may be attached to door 210 or, more specifically, movably attached to door 210. Furthermore, handle portion 212 may be pivotably attached to door 210, in some embodiments.

The locked position of handle portion 212 corresponds to its left-most orientation as, for example, shown in FIG. 2A, while the unlocked position of handle portion 212 corresponds to its right-most orientation as, for example, shown in FIG. 2B. In some embodiments, handle portion 212 may contact frame 220 and/or a portion of door 210 when in it is in the locked position as, for example, shown in FIG. 2A. Specifically, frame 220 and/or the portion of door 210 may be operable as a positive stop. In the same or other embodiments, handle portion 212 may be pressed against fixed support 213 of door 210 when in the unlocked position as, for example, shown in FIG. 2B. In this example, fixed support 213 may be operable as another positive stop.

Integrated lock 200 may also include locking portion 214 attached to handle portion 212. Locking portion 214 may be movable together with handle portion 212 with respect to frame 220. In some embodiments, handle portion 212 and locking portion 214 form a monolithic body. When handle portion 212 is in the locked position and when door 210 is in its closed position, locking portion 214 engages frame 220 and prevents handle portion 221 and door 210 from moving away from frame 220, at least along the Y direction as, for example, shown in FIG. 2A. On the other hand, when handle portion 212 is in the unlocked position, locking portion 214 is configured to stay clear from frame 220 thereby allowing handle portion 212 and door 210 to move away from frame 220, at least along the Y direction as shown, for example, in FIGS. 2B and 2C. It should be noted that when door 210 is in the open position, the position of handle portion 212 is not relevant as locking portion 214 cannot engage frame 220 even when handle portion 212 is in the open position as, for example, shown in FIG. 2D.

In some embodiments, integrated lock 200 also includes handle compression device 216 connected to handle portion 212. Handle compression device 216 may outwardly urge handle portion 212 to the locked position. For example, when handle portion 212 is in the unlocked position and an operator does not exert any force on handle portion 212, handle compression device 216 moves handle portion 212 into the locked position. When handle compression device 216 is present, an operator needs to overcome the force exerted by handle compression device 216 on handle portion 212 in order to advance handle portion 212 into the locked position as schematically shown by the transition from FIG. 2A to FIG. 2B. As such, handle compression device 216 is compressible thereby allowing handle portion 212 to inwardly advance from the locked position into the unlocked position. Some examples of suitable compression device 216 include springs, compressible polymers, gas cylinders with pistons, and the like.

In some embodiments, integrated lock 200 also includes visual indicator 218 controlled by at least one of locking portion 214 or handle portion 212. In the example shown in FIGS. 2A-2D, the position of visual indicator 218 is determined by the position of locking portion 214 as locking portion 214 is operable as an actuator and/or as a positive stop for visual indicator 218 at least when door 210 is closed. For example, when locking portion 214 is in the locked position, visual indicator 218 is pushed to the left as shown in FIG. 2A. On the other hand, when locking portion 214 is in the unlocked position, visual indicator 218 is allowed to advance the right as shown in FIG. 2B. It should be noted that when door 210 is in the open position, locking portion 214 does not determine the position of visual indicator 218 as, for example, shown in FIGS. 2C and 2D.

Visual indicator 218 may be supported by frame 220. More specifically, visual indicator 218 may be slidably attached to frame 220 as shown in FIGS. 2A-2D. As such, when door 210 is opened, visual indicator 218 remains on frame 220 as shown in FIGS. 2C and 2D. In some embodiments, visual indicator 218 may be supported on rails to allow the linear movement. This linear movement may be in the direction substantially normal to frame opening 224 as further described below. Specifically, visual indicator 218 may be advanced with respect to frame opening 224 by locking portion 214 as handle portion 212 moves between the locked position and the unlocked position Visual indicator 218 is configured to provide a locked indication and an unlocked indication to a user. Visual indicator 218 is configured to switch between its locked indication and unlocked indication. The type of indications may depend on the type of visual indicator 218. As, for example, shown in FIGS. 2A-2C, visual indicator 218 may be a mechanical device having first side 219a and second side 219b such that first side 219a has a different color than second side 219b. Depending on the position of visual indicator 218, one of first side 219a or second side 219b may be visible to the user while the other wise may be hidden. Specifically, the color of first side 219a (i.e., the first color) represents the locked indication, while the color of second side 219b (i.e., the second color) represents the unlocked indication.

FIGS. 2A-2D illustrate that visual indicator 218 may be partially hidden by frame 220 that has frame opening 224 that allows to see one of first side 219a or second side 219b at a time. When door 210 extends over this portion of frame 220, then door 210 may have door opening 211 that aligns with frame opening 224 when door 210 is in the closed position as, for example, shown by FIGS. 2A and 2B. Alternatively, a door may not extend over a frame opening when the door is in the closed position as, for example, shown in FIG. 2E. Specifically, FIG. 2E illustrates an example of integrated lock 250 in which door 252 does not extend over frame opening 254. As such, visual indicator may be observed through frame opening 254 alone. Briefly referring to FIG. 1, visual indicators of integrated locks 125a, 125b, 125d, and 125e are not blocked by corresponding doors. On the other hand, visual indicators of integrated locks 125c are blocked by doors 120a-120c. As such, doors 120a-120c have openings for an operator to see the visual indicators of integrated locks 125c.

Returning to FIGS. 2A and 2B, when door 210 is in the closed position and when handle portion 212 is in the locked position, first side 219a of visual indicator 218 is visible through frame opening 224 and door opening 211 as, for example, shown in FIG. 2A. However, when door 210 is still in the closed position but when handle portion 212 is moved in the unlocked position, second side 219b of visual indicator 218 is visible through frame opening 224 and door opening 211 as, for example, shown in FIG. 2B. When door 210 is opened, as shown in FIGS. 2C and 2D, visual indicator 218 is visible through the frame opening 224. At this state, second side 219b of visual indicator 218 is always visible regardless of the position of handle portion 212.

In some embodiments, integrated lock 200 also has frame compression device 226, which may be disposed between frame 220 and visual indicator 218 as, for example, shown in FIGS. 2A-2D. Frame compression device 226 may be configured to urge visual indicator 218 in the direction toward at least one of locking portion 214 or handle portion 212, at least when handle portion 212 is in the locked position. At this state, frame compression device 226 is compressed and first side 219b of visual indicator 218 is aligned with frame opening 224. When handle portion 212 is in the unlocked locked position, frame compression device 226 actually moves visual indicator 218 into a new location such that second side 219b of visual indicator is now aligned with frame opening 224.

Frame compression device 226 may be a spring, compressible block, gas cylinder, and the like. When no external forces is exerted by an operator on handle portion 212 and when locking portion 214 engages visual indicator 218 (e.g., door 210 is in the closed position), frame compression device 226 may remain in the compressed position. Specifically, handle compression device 216 may force locking portion 214 into the locked portion. Locking portion 214, in turn, presses on visual indicator 218, which compresses frame compression device 226.

In some embodiments, a visual indicator includes a light and a switch or some other electrically actuated device, which will now be described with reference to FIGS. 3 and 4. Specifically, FIG. 3 illustrates integrated lock assembly 300 including two integrated locks 310a and 310b, in accordance with some embodiments. First integrated lock 310a has visual indicator 318a that includes light 320a and switch 326a. In this example, switch 326a contacts locking portion 314a when handle portion 312a is in the locked position. As long as handle portion 312a remains is in the locked position, switch 326a does not allow for the current to pass to light 320a and, as a result, light 320a is off. This condition of light 320a may be associated with the locked indication.

Second integrated lock 310b of integrated lock assembly 200 also has visual indicator 318b that includes light 320b and switch 326b. The configuration of second integrated lock 310b may be the same to that of first integrated lock 310a. However, as shown in FIG. 3, handle portion 312b of second integrated lock 310b is in the unlocked position in this example. As such, switch 326b of second integrated lock 310b is in the different state. For example, FIG. 3 illustrates switch 326b extended and not contacting locking portion 314b. As such, when handle portion 312b is in the unlocked position, switch 326b allows the current to pass to light 320b and, as a result, light 320b is on. This condition of light 320b may associate with the unlocked indication. One having ordinary skills in the art would understand how integrated locks 310a and 310b transition between locked and unlocked positions causing different indications of lights 320a and 320b.

Lights 320a and 320b may be positioned on respective frames 322a and 322b. Likewise, switches 326a and 326b may be positioned on respective frames 322a and 322b. Light 320a is at least electrically connected to switch 326a, while light 320b is electrically connected to switch 326b. In some embodiments, light 320a and switch 326a may be integrated into the same housing.

In some embodiments, switch 326a of first integrated lock 310a may control main indicator 328 in addition to light 320a of first integrated lock 310a. Main indicator 328 may not be a part of first integrated lock 310a and, in some embodiments, may be positioned in a central location in a galley system and away from first integrated lock 310a. For example, main indicator 328 may be positioned in a more visible position of the galley system than, for example, location of first integrated lock 310a. It should be noted that light 320a of first integrated lock 310a is positioned locally, while main indicator 328 may be positioned remotely. In a similar manner, switch 326b of second integrated lock 310b may control main indicator 328 in addition to light 320b of first integrated lock 310b. As such, main indicator 328 is controlled by multiple switches or, more generally, by multiple integrated locks.

In this example, main indicator 328 will provide an unlocked indication if any one of integrated lock 310a or integrated lock 310b has an unlocked indication. In the other words, main indicator 328 main only provide a locked only when both integrated lock 310a and integrated lock 310b have locked indications.

Integrated lock assembly 300 provides effective central indication and monitoring of multiple integrated locks. However, adding wires and power supplies may be difficult, especially for galley systems that can reconfigured with different types of doors. FIG. 4 illustrates integrated lock assembly 330 in which main indicator 340 receives wireless signals from each of integrated locks 332a and 332b, in accordance with some embodiments. Specifically, first integrated lock 332a has visual indicator 338a that includes indication device 336a, switch 339a, and antenna 337a. First integrated lock 332a also includes handle portion 334a that moves between locked and unlocked positions and trigger switch 339a. This triggering of switch 339a is communicated using antenna 337a to main indicator 340, which also has antenna 341. Second integrated lock 332b may have a similar design and components. Once the signal is send to main indicator 340, main indicator 340 may adjust its indication accordingly. The indication function of main indicator 340 may be similar to the one described above with reference to FIG. 3. It should be noted that main indicator 340 may retain its indication until further signal is received from one of integrated locks 332a and 332b. Each time one of integrated locks 332a and 332b switches between locked state and unlocked state, a corresponding signal is sent to main indicator 340.

In some embodiments, visual indicator 338a is not connected to an external power source. Instead, visual indicator 338a may have an internal power supply. Alternatively, triggering of switch 339a may also cause power generation.

This power may be sufficient to send, for example, an RF signal to main indicator 340 and other functions, such as changing the indication status of indication device 336a. For example, switch 339a may be a piezoelectric switch that can generate some electrical power as it is activated by handle portion 334a as it moves between the locked position and unlocked position.

In some embodiments, indication device 336a may switch its indication status by applying an electrical power to indication device 336a for a short period of time. The electrical power may not need to be maintained for indication device 336a to remain in one of its indication statuses. For example, indication device 336a may be a reversible electro-chromic device.

Examples of Aircraft Application

Examples of this disclosure may be described in the context of an aircraft manufacturing and service method 1100 as shown in FIG. 5 and aircraft 1102 as shown in FIG. 6. During pre-production, illustrative method 1100 may include specification and design 1104 of the aircraft 1102 and material procurement 1106. During production, component and subassembly manufacturing 1108 and system integration 1110 of aircraft 1102 take place. Thereafter, aircraft 1102 may go through certification and delivery 1112 to be placed in service 1114. While in service by a customer, aircraft 1102 is scheduled for routine maintenance and service 1116 (which may also include modification, reconfiguration, refurbishment, and so on). Integrated locks and/or galley systems having these locks may be used during component and subassembly manufacturing 1108, system integration 1110, certification and deliver 1112, while in service 1114 and/or during maintenance and service 1116. For example, the integrated locks and/or galley systems may be installed prior to delivery of an aircraft to an airline, by an airline prior to operation of the aircraft, or during retrofitting of the existing aircraft.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced may include airframe 1118 with a plurality of high-level systems 1120 and interior 1122. The integrated locks and/or galley systems may be part of interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. An integrated lock for use in a galley system of an aircraft, the integrated lock comprising:
  a frame;
  a door, movable with respect to the frame between an open position and a closed position;
  a handle portion, movably attached to the door and movable between a locked position and an unlocked position;
  a locking portion extending from the handle portion and moveable with the handle portion with respect to the door,
    wherein the locking portion is operable to engage the frame and prevent the door from moving away from the frame thereby maintaining the door in the closed position, when the handle portion is in the locked position, and
    wherein the locking portion is operable to stay clear from the frame thereby allowing the door to move away from the frame between the open position and the closed position, when the handle portion is in the unlocked position; and
  a visual indicator controlled by at least one of the locking portion or the handle portion to alternate between a locked indication and an unlocked indication,
    wherein the visual indicator comprises an indication device and a switch positioned on the frame,
    wherein when the handle portion is in the locked position, at least one of the locking portion or the handle portion moves the switch into an engaged position, thereby causing the indication device to have the locked indication,
    wherein when the handle portion is in the unlocked position, the switch is moved into an extended position, thereby causing the indication device to have the unlocked indication, and
    wherein the switch is operable to self-generate an electrical power for operating the visual indicator when the handle portion moves between the locked position and the unlocked position.

2. The integrated lock of claim 1, wherein the indication device has the locked indication when both the handle portion is in the locked position and the door is in the closed position.

3. The integrated lock of claim 1, wherein the indication device has the locked indication only when both the handle portion is in the locked position and the door is in the closed position.

4. The integrated lock of claim 1, wherein the indication device has the unlocked indication at any time when the door is in the open position.

5. The integrated lock of claim 1, wherein the indication device has the unlocked indication when the handle portion is in the locked position and the door is in the open position.

6. The integrated lock of claim 1, wherein the indication device has the unlocked indication when either the handle portion is in the unlocked position or the door is in the open position.

7. The integrated lock of claim 1, wherein the indication device is operable to switch between the locked indication and the unlocked indication when the switch self-generates the electrical power.

8. The integrated lock of claim 1, wherein the indication device maintains one of the locked indication and the unlocked indication when the switch does not self-generate the electrical power.

9. The integrated lock of claim 1, wherein the visual indicator further comprises an antenna for wireless communication with a main indicator and transmitting a wireless signal to the main indicator when the switch self-generates the electrical power.

10. The integrated lock of claim 1, further comprising a handle compression device connected to the handle portion and outwardly urging the handle portion to the locked position.

11. The integrated lock of claim 10, wherein the handle compression device is compressible thereby allowing the handle portion to inwardly advance from the locked position to the unlocked position.

12. An integrated lock assembly for use in a galley system of an aircraft, the integrated lock assembly comprising:
a frame;
a first door moveable with respect to the frame between a first open position and a first closed position;
a second door moveable with respect to the frame between a second open position and a second closed position;
a first integrated lock comprising:
a first handle portion, moveably attached to the first door and moveable between a first locked position and a first unlocked position, and
a first switch positioned on the frame,
wherein when the first handle portion is in the first locked position, the first handle portion is operable to engage the frame and prevent the first door from moving away from the frame thereby maintaining the first door in the first closed position, and the first handle portion moves the first switch into a first engaged position,
wherein when the first handle portion is in the first unlocked position, the first handle portion is operable to stay clear from the frame thereby allowing the first door to move away from the frame between the first closed position and the first open position, and the first switch is moved into a first extended position,
wherein the first switch is operable to self-generate an electrical power when the first handle portion moves between the first locked position and the first unlocked position, wherein the first switch is a piezoelectric switch;
a second integrated lock comprising:
a second handle portion, moveably attached to the second door and moveable between a second locked position and second unlocked position, and
a second switch positioned on the frame,
wherein when the second handle portion is in the second locked position, the second handle portion is operable to engage the frame and prevent the second door from moving away from the frame thereby maintaining the second door in the second closed position, and the second handle portion moves the second switch into a second engaged position,
wherein when the second handle portion is in the second unlocked position, the second handle portion is operable to stay clear from the frame thereby allowing the second door to move away from the frame between the second closed position and the second open position, and the second switch is moved into a second extended position,
wherein the second switch is operable to self-generate an electrical power when the second handle portion moves between the second locked position and the second unlocked position, wherein the second switch is a piezoelectric switch; and
a main indicator, communicatively coupled to the first switch and to the second switch and operable to change between a locked indication and an unlocked indication based on a signal generated by one of the first switch and the second switch.

13. The integrated lock assembly of claim 12, wherein the main indicator is wirelessly coupled to the first switch and to the second switch.

14. The integrated lock assembly of claim 12, wherein the main indicator is coupled to the first switch and to the second switch using wires.

15. The integrated lock assembly of claim 12, wherein the main indicator is operable to have the locked indication only when both the first handle portion is in the first locked position and the second handle portion is in the second locked position.

16. The integrated lock assembly of claim 12, wherein the main indicator is operable to have the unlocked indication when at least one of the first handle portion is in the first unlocked position or the second handle portion is in the second unlocked position.

17. An aircraft, comprising a galley system, wherein the galley system of the aircraft comprises an integrated lock comprising:
a frame;
a door, movable with respect to the frame between an open position and a closed position;
a handle portion, movably attached to the door and movable between a locked position and an unlocked position;
a locking portion extending from the handle portion and moveable with the handle portion with respect to the door,
wherein the locking portion is operable to engage the frame and prevent the door from moving away from the frame thereby maintaining the door in the closed position, when the handle portion is in the locked position, and
wherein the locking portion is operable to stay clear from the frame thereby allowing the door to move away from the frame between the open position and the closed position, when the handle portion is in the unlocked position; and a visual indicator controlled by at least one of the locking portion or the handle portion to alternate between a locked indication and an unlocked indication, wherein the visual indicator comprises an indication device and a switch positioned on the frame, wherein when the handle portion is in the locked position, at least one of the locking portion or the handle portion moves the switch into an engaged position, thereby causing the indication device to have the locked indication, wherein when the handle portion is in the unlocked position, the switch is moved into an extended position, thereby causing the indication device to have the unlocked indication, and wherein the switch is operable to self-generate an electrical power for operating the visual indicator when the handle portion moves between the locked position and the unlocked position.

18. The integrated lock of claim 1, wherein the switch is a piezoelectric switch.

19. The integrated lock of claim 1, wherein the indication device is a reversible electro-chromic device.

20. The integrated lock assembly of claim 12, wherein the main indicator comprises a reversible electro-chromic device.

* * * * *